B. STECHBART.
REELING MECHANISM FOR MOTION PICTURE MACHINES.
APPLICATION FILED MAY 7, 1917.

1,287,498.

Patented Dec. 10, 1918.
3 SHEETS—SHEET 1.

Witness:
John Enders

Inventor:
Bruno Stechbart,
by Robert Burns,
Atty.

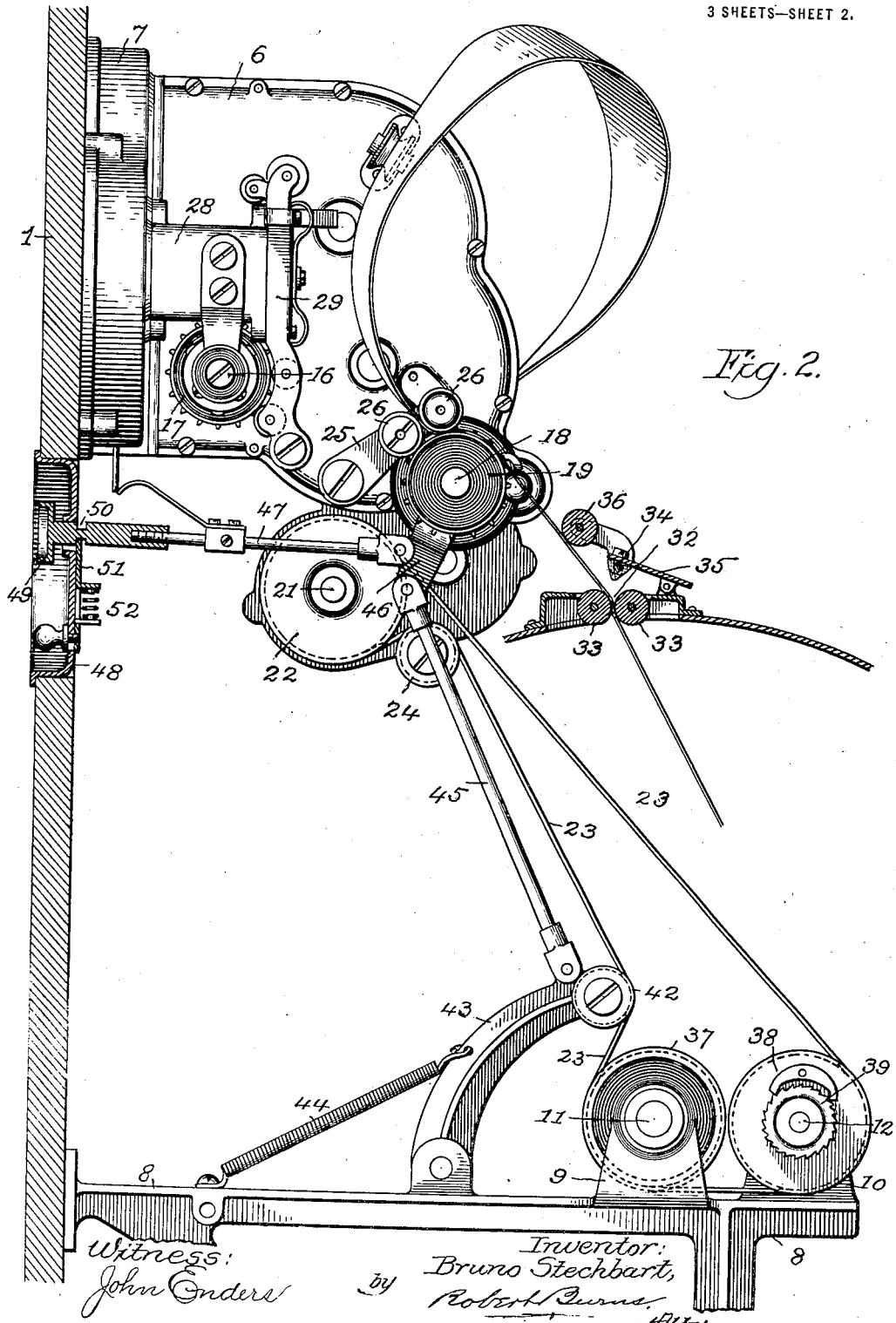

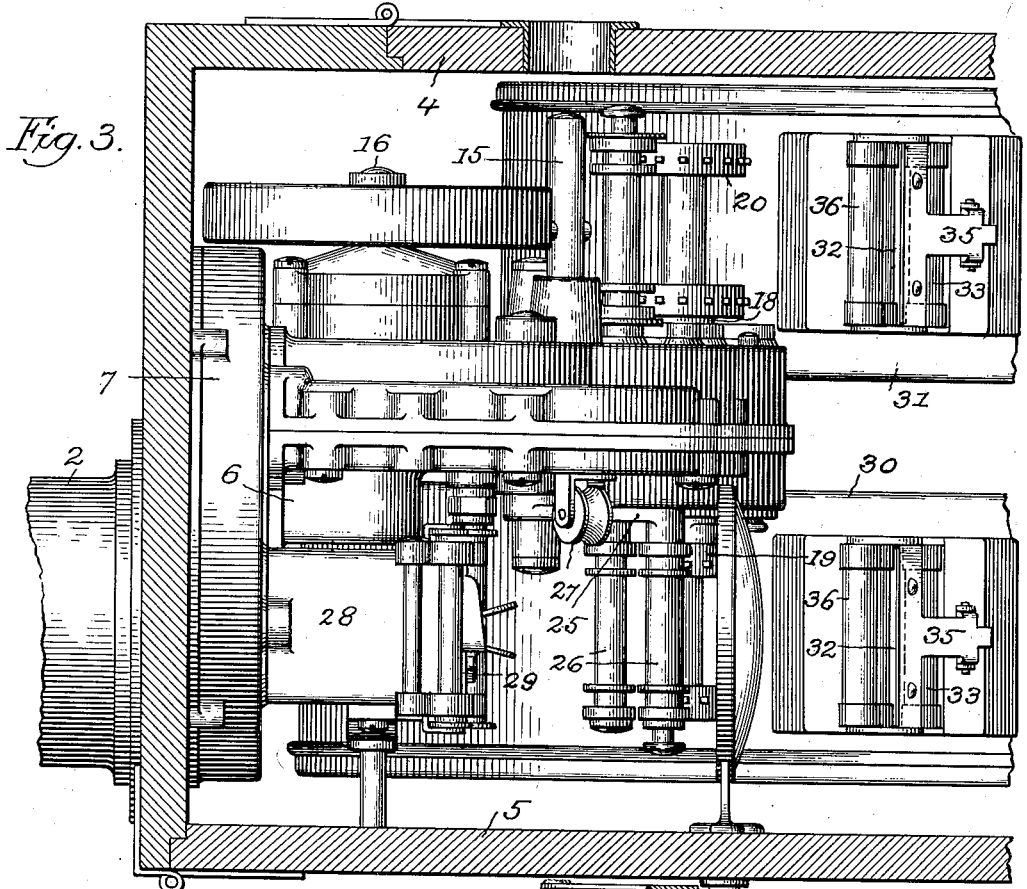

UNITED STATES PATENT OFFICE.

BRUNO STECHBART, OF CHICAGO, ILLINOIS, ASSIGNOR, BY MESNE ASSIGNMENTS, TO AMERICAN PROJECTING COMPANY, OF CHICAGO, ILLINOIS, A CORPORATION OF DELAWARE.

REELING MECHANISM FOR MOTION-PICTURE MACHINES.

1,287,498. Specification of Letters Patent. Patented Dec. 10, 1918.

Application filed May 7, 1917. Serial No. 166,866.

*To all whom it may concern:*

Be it known that I, BRUNO STECHBART, a citizen of the United States of America, and a resident of Chicago, in the county of Cook, State of Illinois, have invented certain new and useful Improvements in Reeling Mechanisms for Motion-Picture Machines, of which the following is a specification.

This invention relates to that type of film reeling mechanisms for motion picture machines, in which a pair of inter-connected film reels arranged in adjacent relation, are adapted in the different operations of the motion picture machine, to deliver and receive the picture film as it passes to and from the film feeding mechanism of the machine. And the present improvement has for its various objects:—

To provide a simple and efficient structural association of the pair of coöperating film reels and their intermediate driving means, adapted to afford a ready, positive and individual rotation of each reel in a direction opposite to that of the companion reel, and with which a change in such positive drive from one to the other reel can be readily and conveniently effected by the operator, as desired. And with which in addition, all driving connections can be released, so that the film revised operation from the normal receiving reel back upon the normal delivery reel, can be easily effected, after a passage of the picture film through the machine in giving an exhibition thereof.

To provide means for mounting the companion film reels of a motion picture machine, in a readily detachable manner within the inclosing magazines, and which at the same time effects the centering of the reels in concentric relation to the axes of their carrying shafts, all as will hereinafter more fully appear.

In the accompanying drawings:—

Fig. 2, is an enlarged detail side elevation of the driving mechanism of the film reels and accessories, with parts shown in section.

Fig. 3, is a detail plan showing the film guiding and feeding mechanism, and the magazines of the film reels in associated relation.

Fig. 4, is a detail horizontal section on line 4—4, Fig. 1.

Similar reference numerals indicate like parts in the several views.

Figure 1:
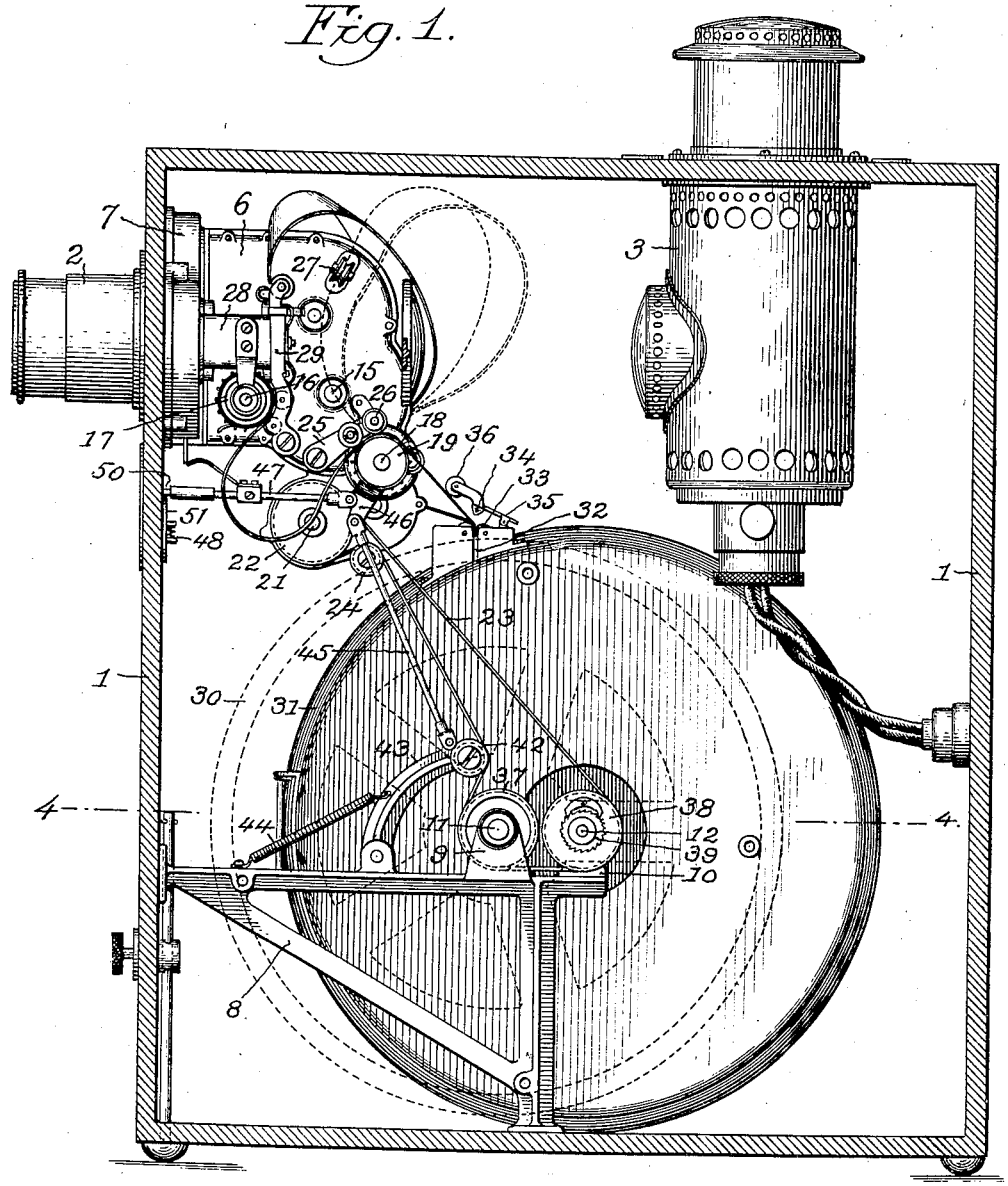
Figure 1, is a side elevation of a motion picture machine, illustrating the general arrangement of parts in the present invention, the inclosing casing and other parts being shown in section.

Referring to the drawings, 1 designates a box or casing, preferably of a rectangular form as shown, and adapted to inclose the film feeding, film guiding and film reeling mechanisms of a motion picture machine, and afford a support for the usual optical objective 2, lamp house 3 and condenser usually associated in a motion picture machine. With a view to afford convenient access to the contained film feeding, guiding and reeling mechanisms, in the varied operations of the same in actual use, the main portions of the respective side walls are hinged to the main portion of the box or casing 1 to constitute entry doors 4 and 5 to the interior of the same.

6 designates the supporting frame or casing for the film feeding and guiding mechanisms above referred to, secured to the front wall of the casing 1, and provided at its forward end with an expanded transverse portion 7 adapted to contain the light shutter of the machine.

8 designates a frame or standard secured in place in the lower part of the casing 1 and near the mid-width of the same. Said frame or standard is provided with a pair of journal bearings 9 and 10, disposed in longitudinally spaced relation to each other and providing bearings for the reel carrying shafts 11, 12 of the present structure. In the present improvement the shafts 11, 12 are revolubly mounted at one end in the aforesaid bearings 9, 10 with their other and free ends extending in reverse directions into the interiors of the hereinafter described stationary reel magazines, to revolubly support the film supply and take-up reels 13, 14 of the machine, as shown more particularly in Fig. 4.

15 designates the main or crank shaft of the machine, journaled in the frame 6 aforesaid, and adapted for engagement with a removable hand crank for manual actuation.

16 designates a shaft journaled transversely in the frame 6, aforesaid, and having intermediate operative connection with the main shaft 15, by the usual train of gearing and an intermittent gearing connection, such as the ordinary Geneva movement, as shown and described in detail in my companion application for Letters Patent, Serial No. 166,865, filed May 7, 1917.

17 designates the intermittent film feeding sprocket drum of the machine, and operatively carried by the shaft 16 aforesaid.

18 designates a clutch carrying shaft journaled in the frame 6 aforesaid, and having operative connection with the main shaft 15, by the usual train of gearing, and capable of engagement with and disengagement from said gearing, by an automatic clutch connection, described in detail in my aforesaid companion application. The shaft 18 extends approximately the width of the mechanism, and its respective ends carry sprocket drums 19 and 20, individual to the respective film reels 13, 14 aforesaid, and adapted to guide and feed the picture film to and from said reels in its different movements in actual use.

21 designates a shaft journaled in the frame 6 aforesaid, and having gearing connection with the shaft 16 aforesaid.

22 designates a driving pulley carried by the shaft 21, and adapted for driving engagement with the endless driving belt 23 of the operating means of the film reels 13, 14, hereinafter described in detail.

24 designates an idler pulley journaled on the frame 6 aforesaid, in adjacent relation to the driving pulley 22, and adapted to impose upon the driving belt 23 an extended periphery contact with said pulley 22, as shown.

25 designates swinging arms pivoted at opposite sides of the frame 6 aforesaid, and each carrying near its free end a pair of bearing rollers 26. Each pair of rollers 26 are individual to a sprocket drum 19, 20, and normally adapted to maintain the picture film in peripheral engagement with said sprocket drums. The pivotal arrangement of the carrying arms 25 of the bearing rollers 26, admits of said rollers being moved away from the sprocket drums 19, 20, in the operation of removing an exhibited film, as well as the threading of a fresh picture film through the mechanism. Each pair of bearing rollers 26 have a slight spaced relation, so that in the operation of rewinding a picture film back onto the normal delivery reel, in which the film is unthreaded from the intermittent film feeding mechanisms and accessories, the film in such unthreaded condition can be inserted between the pair of rollers 26 which are individual to the delivery reel in such re-winding operation, in order that the film may be guided by said rollers into the oblique bend or loop which the film must necessarily assume in its passage from one film reel to the other in the present structural arrangement of parts.

27 designates a peripherally grooved roller journaled in an inclined direction on the side of the frame 6 aforesaid, with its peripheral groove adapted to have holding and guiding engagement with an edge of the picture film to maintain its oblique loop in proper position during the film rewinding operation above set forth.

28 designates a light shell or passage forming a part of the frame 6 aforesaid, with its forward end adapted to receive the objective 2 of the machine, while its rear end carries the usual aperture plate of the machine, and with which aperture plate is associated, the hinged film confining gate 29, of any usual and suitable construction.

30 and 31 designate individual reel magazines disposed in staggered relation at the respective sides of the fixed frame or standard 8 aforesaid and provided with the usual hinged doors at their sides remote from the aforesaid standard 8 for effecting a ready placing and removal of the supply and take-up reels, 13, 14, onto and from the carrying shafts 11, 12 aforesaid. The magazines 30, 31 are in addition provided with the usual peripheral orifices 32 for the passage of the film to and from the film reels 13, 14, in the usual operations of a motion picture machine.

33 designate transverse guide and friction reducing rollers arranged at the margins of the respective peripheral orifices 32 of the reel magazines 30, 31, aforesaid.

34 designates a swinging valve or gate triangular in cross-section, arranged in operative relation to an orifice 32 of a magazine aforesaid, and adapted to close the gap between a pair of the marginal rollers 33, in the event of the picture film taking fire outside a magazine.

35 designates the carrying plate or frame of the valve or gate 34, pivoted at one end to a magazine and carrying said valve or gate 34 near its mid-length.

36 designates a bearing roller journaled in the free end of the frame 35, and adapted to ride upon a tensioned portion of the picture film, and hold said gate or valve 34 away from the guide rollers 33 in the normal operation of the mechanism. With an accidental firing of said film, the gate or valve 34, will drop by gravity and close the gap or opening between the rollers 33, as the fire releases the tension normally on the picture film.

37 and 38 designate companion driven pulleys mounted on the before described carrying shaft 11, 12, of the film reels 13, 14, and operatively connected thereto by pawl and ratchet connections 39, so that positive rotation can be imparted to a reel shaft 11, 12, in one direction only, the particular pulley running idle when rotated in the opposite direction.

In the present improvement, the driven pulleys 37, 38, have a spaced relation longitudinally, in order that the aforesaid endless driving belt 23 in engagement with the driving pulley 22, can pass around and beneath the said driven pulleys 37, 38, to impart simultaneous rotation to said pulleys and in the same direction. With the above described arrangement of parts, a travel of the endless belt 23 in one direction will effect a positive rotation of one film reel in one direction, with the companion film reel running idle, while with a travel of the endless belt 23 in the opposite direction, the last mentioned film reel will receive positive rotation, while the first mentioned reel will run idle.

40 designate fixed centering cones on the reel shaft 11, 12, adjacent to their journal bearings. And 41 designate adjustable centering cones having movement on the outer portions of said shafts, and preferably formed as integral parts of screw-threaded collars which screw upon screw-threaded portions of the reel shafts 11, 12, to properly center and clamp the film reels 13, 14, on their respective carrying shafts.

42 designates a tightening roller or drum journaled in the upper end of a carrying frame 43, which is pivotally connected at its lower end to the frame or standard 8 aforesaid. The said frame 43 is preferably of the curved form and arranged in an inclined position as shown, with its roller or drum 42 having bearing against the endless driving belt 23 at a distance away from the point of engagement of said endless belt with the driven pulleys 37, 38 of the reeling mechanism aforesaid.

44 designates a spring associated with the tightener frame 43 aforesaid, and adapted to draw the same away from the tightening engagement of its roller or drum 42 with the endless driving belt 23 aforesaid.

45 designates a link pivoted at its lower end to the tightener frame 43 aforesaid, and at its upper end to the lower end of a companion link 46, the upper end of which is journaled on the clutch shaft 18 aforesaid, and adapted for automatic operative engagement with the clutch of said shaft, as set forth in my aforesaid companion application, Ser. No. 166,865.

The aforesaid companion links 45, 46, constitute a toggle formation, which when forcibly straightened, by means hereinafter described, will cause the tightener roller or drum 42 to bear against and tighten the endless belt 23 upon its associated belt pulleys aforesaid.

47 designates a horizontally disposed operating rod, the inner end of which is pivotally connected to the upper link 46 aforesaid, while its outer portion slides in a latch plate 48 on the casing 1, and is provided with an operating handle or knob 49 for convenient manual operation. Said operating rod 47 is formed with a peripheral groove 50 near its outer end for locking engagement with a spring bolt or latch as follows:—

51 designates a vertically sliding latch bolt on the latch plate 48 aforesaid, with a normal tendency under the influence of a spring 52 to engage in the peripheral groove 50 of the operating rod 47 to hold the same and the associated toggle and belt tightening means in their active positions, and with the film reels adapted to act as delivery and take up reels for the film passing through the motion picture mechanism.

With a release of the latch bolt 51, the belt tightening means aforesaid moves into an inactive position under the influence of the spring 44 aforesaid, and the mechanism is in condition for a film re-winding operation by hand, and through the instrumentality of a removable hand crank 53 on the carrying shaft 12 of the delivery reel 14, and in which operation the film is wound or reeled back onto the delivery reel 14 from the receiving reel 13, after an exhibition has been made of said film and so that the same may be in proper reeled condition for subsequent use.

Having thus fully described my said invention, what I claim as new and desire to secure by Letters Patent, is:—

1. In a film reeling mechanism for motion picture machines, the combination of a pair of journal bearings arranged in parallel relation, individual carrying shafts journaled in said bearings and having free end portions extending in opposite directions, supply and take-up film reels mounted on said free end portions of the shafts in staggered relation to each other, and driving means having operative engagement with said shafts adjacent to the aforesaid bearings, substantially as set forth.

2. In a film reeling mechanism for motion picture machines, the combination of a pair of journal bearings arranged in parallel relation on a horizontal plane, individual carrying shafts journaled in said bearings and having free end portions extending in opposite directions, supply and take-up film reels mounted on said free end portions of the shafts in staggered relation to each other, and driving means having operative engagement with said shafts adjacent to the aforesaid bearings, substantially as set forth.

3. In a film reeling mechanism for motion picture machines, the combination of a pair of journal bearings arranged in parallel relation, individual carrying shafts journaled in said bearings and having free ends extending in opposite directions, supply and take-up film reels mounted on said free end portions of the shafts in staggered relation to each other, and driving means having operative engagement with said shafts adjacent to the aforesaid bearings and adapted to impart positive rotation to the shafts in one direction only, substantially as set forth.

4. In a film reeling mechanism for motion picture machines, the combination of a pair of journal bearings arranged in parallel relation on a horizontal plane, individual carrying shafts journaled in said bearings and having free end portions extending in opposite directions, supply and take-up film reels mounted on said free end portions of the shafts in staggered relation to each other and driving means having operative engagement with said shafts adjacent to the aforesaid bearings and adapted to impart positive rotation to the shafts in one direction only, substantially as set forth.

5. In a film reeling mechanism for motion picture machines, the combination of a pair of journal bearings arranged in parallel relation, individual carrying shafts journaled in said bearings and having free end portions extending in opposite directions, supply and take-up film reels mounted on said free end portions of the shafts in staggered relation to each other, and driving means having operative engagement with said shafts adjacent to the aforesaid bearings, the shaft carrying the take-up reel having manual actuating means, substantially as set forth.

6. In a film reeling mechanism for motion picture machines, the combination of a pair of journal bearings arranged in parallel relation on a horizontal plane, individual carrying shafts journaled in said bearings and having free end portions extending in opposite directions, supply and take-up film reels mounted on said free end portions of the shafts in staggered relation to each other, and driving means having operative engagement with said shafts adjacent to the aforesaid bearings, the shaft carrying the take-up reel having manual actuating means, substantially as set forth.

7. In a film reeling mechanism for motion picture machines, the combination of a centrally arranged frame, a pair of journal bearings mounted in parallel relation on said frame, individual carrying shafts journaled in said bearings and having free end portions extending in opposite directions past said frame, supply and take-up film reels mounted on said free end portions of the shafts in staggered relation to each other, driven pulleys arranged on said shafts adjacent to the aforesaid bearings, a driving pulley, and an endless belt common to said driving and driven pulleys, substantially as set forth.

8. In a film reeling mechanism for motion picture machines, the combination of a centrally arranged frame, a pair of journal bearings mounted in parallel relation on said frame, individual carrying shafts journaled in said bearings and having free end portions extending in opposite directions past said frame, supply and take-up film reels mounted on said free end portions of the shafts in staggered relation to each other, driven pulleys arranged on said shafts adjacent to the aforesaid bearings and connected to said shafts for positive engagement in one direction only, a driving pulley, and an endless belt common to said driving and driven pulleys, substantially as set forth.

9. In a film reeling mechanism for motion picture machines, the combination of a centrally arranged frame, a pair of journal bearings mounted in parallel relation on said frame, individual carrying shafts journaled in said bearings and having free end portions extending in opposite directions past said frame, supply and take-up film reels mounted on said free end portions of the shafts in staggered relation to each other, the shaft carrying the take-up reel having manual actuating means, driven pulleys arranged on said shafts adjacent to the aforesaid bearings, a driving pulley, and an endless belt common to said driving and driven pulleys, substantially as set forth.

10. In a film reeling mechanism for motion picture machines, the combination of a centrally arranged frame, a pair of journal bearings mounted in parallel relation on said frame, individual carrying shafts journaled in said bearings and having free end portions extending in opposite directions past said frame, supply and take-up film reels mounted on said free end portions of the shafts in staggered relation to each other, driven pulleys arranged on said shafts adjacent to the aforesaid bearings, a driving pulley, and an endless belt common to said driving and driven pulleys, and manually actuated means for tightening said belt, substantially as set forth.

11. In a film reeling mechanism for motion picture machines, the combination of a centrally arranged frame, a pair of journal bearings mounted in parallel relation on said frame, individual carrying shafts journaled in said bearings and having free end portions extending in opposite directions past said frame, supply and take-up film reels mounted on said free end portions of the shafts in staggered relation to each other, driven pulleys arranged on said shafts adjacent to the aforesaid bearings, a driving pulley, an endless belt common to said driving and driven pulleys, and manually actuated means for tightening said belt, the same comprising a tightener drum, a pair of toggle links carrying said drum, and a push rod operatively connected to said links, substantially as set forth.

12. In a film reeling mechanism for motion picture machines, the combination of a centrally arranged frame, a pair of journal bearings mounted in parallel relation on said frame, individual carrying shafts journaled in said bearings and having free end portions extending in opposite directions past said frame, supply and take-up film reels mounted on said free end portions of the shafts in staggered relation to each other, driven pulleys arranged on said shafts adjacent to the aforesaid bearings, a driving pulley, an endless belt common to said driving and driven pulleys, and manually actuated means for tightening said belt, the same comprising a tightener drum, a pair of toggle links carrying said drum, a push rod operatively connected to said links, and a spring associated with said links and adapted to move the same in one direction, substantially as set forth.

13. In a film reeling mechanism for motion picture machines, the combination of a centrally arranged frame, a pair of journal bearings mounted in parallel relation on said frame, individual carrying shafts journaled in said bearings and having free end portions extending in opposite directions past said frame, supply and take-up film reels mounted on said free end portions of the shafts in staggered relation to each other, driven pulleys arranged on said shafts adjacent to the aforesaid bearings, a driving pulley, and an endless belt common to said driving and driven pulleys, and manually actuated means for tightening said belt, the same comprising a tightener drum, a pair of toggle links carrying said drum, a push rod operatively connected to said links, and a latch bar adapted for holding engagement with said push rod, substantially as set forth.

14. In a film reeling mechanism for motion picture machines, the combination of a centrally arranged frame, a pair of journal bearings mounted in parallel relation on said frame, individual carrying shafts journaled in said bearings and having free end portions extending in opposite directions past said frame, supply and take-up film reels mounted on said free end portions of the shafts in staggered relation to each other, driven pulleys arranged on said shafts adjacent to the aforesaid bearings, a driving pulley, an endless belt common to said driving and driven pulleys, and manually actuated means for tightening said belt, the same comprising a tightener, drum, a pair of toggle links carrying said drum, a push rod operatively connected to said links and having a peripheral groove, and a latch bar adapted for holding engagement with said groove, substantially as set forth.

Signed at Chicago, Illinois, this 16th day of April, 1917.

BRUNO STECHBART.